Patented Jan. 20, 1931

1,789,751

UNITED STATES PATENT OFFICE

STANLEY HILLER, OF OAKLAND, CALIFORNIA

RENDERING PROCESS

Application filed May 26, 1925. Serial No. 32,953.

The present invention relates to novel processes and apparatus for rendering oil and fat containing solids such as fish, fish waste, animal fats, meat scrap, packinghouse offal, tankage, dead animals, rejected or condemned carcasses, grains, seeds, coconuts, olives, nuts, garbage, and the like.

More particularly the invention relates to a continuous process of rendering materials of the character mentioned by use of a continuous pressure sterilizing and disintegrating unit, and a vacuum drying unit in combination with a continuous press. The materials to be rendered are preferably passed continuously through a sterilizing and disintegrating unit in which they are subjected to the action of steam under pressure until thorough sterilization has been effected. The steam pressures are preferably developed from the natural moisture content of the materials to be rendered by heating in a jacketed retort to avoid so far as possible addition of moisture to the materials. Due to the action of the steam pressure on the materials, disintegration of the oil bearing cellular structure may be effected and a large percentage of the fats may be freed in this manner. Relatively large particles of bone may be passed into the sterilizing and digesting unit and reduced to a soft or mushy condition under suitable pressure conditions. The passage of the material through the sterilizing and digesting unit is controlled so that the necessary sterilization and desired degree of disintegration is attained; and the digested and sterilized material is then passed continuously into and through a vacuum drying and rendering unit whereby the material is heated to complete the rendering thereof and to condition the solid residue for continuous expressing.

To effect satisfactory continuous pressing in a high pressure screw press I have discovered that the moisture content of the solid residue must be reduced below 20 per cent and preferably to the range of 5 to 15 per cent. As the materials come from the sterilizing unit the moisture in the solid residue may be considerably above 20 per cent; and the fats are of high quality. By completing the rendering and simultaneously partially dehydrating in a vacuum the process is speeded and the advantages of my prior vacuum dry rendering system disclosed in copending applications S. N. 544,292, filed April 17, 1922, and S. N. 656,095, filed August 6, 1923, are retained, while sterilized and improved grades of fats and oils are produced.

A preferred arrangement of apparatus for carrying out my process is disclosed in the drawing.

The materials to be treated are passed continuously through a feed hopper 1 to a pocket valve 2. Valve 2 is provided with a plurality of pockets separated by vanes in which the material is carried into the sterilizer and digester body while a continuous mechanical pressure seal is maintained independently of the material. Valves of this type are fully disclosed in copending application S. N. 656,095, filed August 6, 1923, and in U. S. Patent No. 1,489,940, issued April 8, 1924, to which reference may be had for a more complete disclosure thereof.

Materials passed continuously through the valve 2 are dropped into the upper feed conveyor screw 3 suitably journaled at 4 and are fed to the left through the heated cylinder 5. At the end of the cylinder 5 the materials drop downward through section 6.

The sections 5 and 10 are provided with heating jackets 13 and 14 into which a heating medium such as steam under pressure may be passed through inlet and outlet sections 15 and 16 and the communicating connection 17. External steam under pressure may be fed into cylinders 5 and 10 through the steam pipe 18 and valve 19, and a pressure relief or safety valve 20 is provided to relieve excessive internal pressures in these cylinders.

The discharge valve 11 of the sterilizing and digesting unit is the feed valve for the vacuum unit. The materials passing through valve 11 are discharged into the upper section of the vacuum unit into the conveyor screw 23, journaled at 24. The screw 23 carries the materials to the left in the cylinder 25 and as the materials pass out of the section 25 they drop downward through connecting section 26 into the conveyor screw 27, journaled at 28 and 29. Screw 27 carries the material to the right through the lower cylinder 30, and from cylinder 30 the materials are discharged into the valve 31. Valve 31 is similar in structure to the valves 2 and 11 and continuously carries the material out of the unit without permitting substantial variations of the degree of vacuum. The sections 25 and 30 are provided with heating jackets 33 and 34 through which the heating steam under pressure is passed by means of inlet and outlet connections 35 and 36, and the communicating connection 37. The vapors and gases evolved in the passage of the material through cylinders 25 and 30 are withdrawn through vapor outlet connections 38 by means of a suitable vacuum pump 38' which is sufficient in size and operated in a manner to maintain the desired degree of vacuum. The materials discharged from the valve 31 are passed through 39 to a conveyor and drain casing 40. Mounted in casing 40 is a conveyor screw 41 which passes the materials over screen 42. In passing over screen 42 the free hot fats and oils are drained through drain pipe 43' and the solid residue is discharged into a high pressure press 43. In the press 43 the solid residue is continuously expressed under pressures ranging from approximately five hundred pounds per square inch upwards, to remove a substantial portion of the fats and oils remaining therein.

*Operation*

In operation, the various valves, conveyors, and the press are driven in any well known manner at the proper speeds to effect the complete and continuous rendering of materials to be treated. The materials are reduced or cut to a suitable size to be handled by the valves, or smaller if desired, and if dirty are washed, and are then fed into the sterilizer and heated, preferably by steam admitted in the heating jacket of the sterilizer to a temperature sufficient to generate relatively high steam pressures from the natural moisture content of the materials and the moisture added due to washing if necessary. The natural moisture content of materials such as fat and oil containing animal and fish parts is ample to generate sufficient sterilizing and digesting pressures, but if desired steam under pressure may be fed into the cylinders 5 and 10. Steam under pressures varying from 5 to 60 or more pounds per square inch depending upon the nature of the materials to be treated is maintained continuously in the sterilizing and digesting unit, and pressures as high as 100 pounds per square inch or more may be maintained in the heating jackets. For rendering certain grades of fish, such as herring, menhaden, and the like, the low pressures may be utilized but for the disintegration and sterilization of heavy boned fish as salmon and for the handling of animal fats and dead animal parts, pressures of 30 to 60 pounds per square inch and upwards are preferably utilized. As the material passes through the cylinders 5 and 10 the action of the steam pressures and heat breaks down the solid structure thereof, melting and freeing a substantial portion of the fats and oils; and thorough sterilization is effected. At the same time steam is developed and the pressures are maintained by evaporation of the moisture content of the materials being rendered. The excess steam generated in the process is exhausted through the relief valve (not shown) connected to pipe 18 and in the pockets formed between the vanes of the valves 2 and 11 at a rate that will maintain the desired sterilizing pressure, and the escaping steam lowers the moisture content of the material. The speeds of operation of the valves and conveyor screws are regulated to permit the desired sterilization and disintegration of the products in the digesting body. By lengthening the time during which the material is retained in the digesting unit, particles such as bone may be disintegrated and reduced to a mushy condition or digested condition in which they may be passed through a continuous screw press without scoring the press structure. At the completion of this stage of the treatment with the material thoroughly digested and sterilized, the fats are unharmed in quality, and the moisture content is too high for satisfactory continuous expressing of the residue.

When the desired degree of sterilization and disintegration or digesting has been effected the materials are discharged continuously into the vacuum rendering and drying unit. The pressure of the steam in the jackets 33 and 34 of the vacuum unit may be maintained considerably below the pressure in the jackets 13 and 14 of the digesting and sterilizing unit so that the rendering temperatures to which the materials are subjected in this stage are correspondingly reduced. Jacket pressures as low as 10 pounds per square inch and less may be effectively utilized. The materials are retained in the vacuum unit a sufficient time to reduce the moisture content of the solid residue below 20 per cent and preferably in the range of 5 to 15 per cent. The moisture driven off in the form of vapors is withdrawn through the connections 38 by the vacuum pump as evolved so that a pressure substantially below atmospheric is continuously maintained. The treatment of the material in the vacuum effects a rapid dehydration to the point where the solid residue or cracklings may be continually expressed as they are discharged from the valve 31. The material as discharged from valve 31 comprises a mixture of free hot fats and oils, and solid partially dehydrated residue or cracklings, and this mixture is passed continuously to the press. In the press feed conveyor the free hot fats and oils are drained away and the solid residue passes into a high pressure continuous press where it is continuously expressed to remove a substantial percentage of the fats and oils remaining in the solids. Pressures of several hundred pounds per square inch are developed in the press. The cake from the press is ground into a meal to be utilized as or in the preparation of stock food or fertilizer. Meals of higher water solubility, lower fiber content, lower fat percentage and higher availability are produced in this way than are produced from the residue in the usual dry rendering process.

By way of specific example I have found in treating salmon waste that if the salmon waste is fed through valve 2 in relatively large pieces as they come from the cutting and trimming tables, steam pressures of approximately 30 pounds per square inch for a period of approximately 20 minutes are desirable to digest materials to a proper stage for dehydration. When the waste is disintegrated mechanically by grinding before being fed to the digestion unit from 10 to 15 minutes at 30 pounds pressure are sufficient, but it will be understood that longer treatments may be given without injury. The digested salmon waste passes continuously to cylinders 25 and 30. The jacket steam pressure for cylinders 25 and 30 is preferably maintained at approximately 10 pounds per square inch, and the cylinders 25 and 30 together with the operation of pump 38 is so regulated that the moisture content of the solids in the materials is reduced below 20% as it passes out of valve 31. When the steam pressures in cylinders 5 and 10 are developed from the moisture contained in the salmon and substantial venting is carried on through the valve 20 in the digesting operation, moisture may be eliminated during digesting until the moisture content of the solids passing through the valve 11 is between 20 to 40 per cent, and preferably in the range of 27 to 35 per cent and correspondingly shorter treatment in the dehydrating cylinders will be required.

Where the elimination of moisture by venting through valve 20 during the digesting operation is not carried forward it will be understood that a greater amount of moisture must be eliminated in the cylinders 25 and 30. Different proportions of the digesting cylinders 5 and 10 with respect to the proportions of the digesting unit may in such a case be utilized, or the jacket steam pressures and the degree of vacuum in the dehydrating unit may be varied, or both pressures and proportions may be varied to provide a continuous discharge of materials from valve 31 with the moisture content of the solid residue below 20%, and preferably in the range of 5 to 15 per cent. In such a case jacket pressures as high as 80 to 100 pounds may be used on the dehydrating unit if substantial subatmospheric pressures are maintained by exhausting the evolved vapors.

When animal offal containing hard animal bones is treated, it will be understood that the length of digesting treatment, the pressures by which digestion proceeds and the dehydration period are suitably increased, the treatment for each material being varied as will be well understood by those skilled in the art, in accordance with its nature, the amount of bone present, and the size of the pieces fed into the digesting unit.

Having thus described a preferred embodiment of my invention, what is desired to be secured by Letters Patent and claimed as new is:

1. A continuous process of rendering fat-containing solid materials of animal origin which comprises continuously digesting the same under high steam pressures to melt fats and oils in the solid materials, continuously dehydrating the digested material in a vacuum to a moisture content below 20 per cent, continuously draining the free hot fats and oils from the dehydrated solids; and continuously expressing residual fats and oils from the solids.

2. The continuous process of rendering fat and oil containing solid material of animal origin which comprises continuously digesting the same under high steam pressures developed from the moisture contained therein to melt the fats and oils in the solid materials, continuously dehydrating the digested materials in a vacuum to a moisture content below 20 per cent, continuously draining the free hot fats and oils from the dehydrated solids, and continuously expressing the residual fats and oils from the solids by the application of progressive pressure thereto.

In testimony whereof, I affix my signature.

STANLEY HILLER.